United States Patent
Ehrfeld et al.

(10) Patent No.: US 7,396,684 B2
(45) Date of Patent: Jul. 8, 2008

(54) METHOD FOR QUANTITATIVELY AND/OR QUALITATIVELY DETECTING LAYER THICKNESSES, A MICROREACTION VESSEL AND TITRE PLATE

(75) Inventors: Wolfgang Ehrfeld, Mainz (DE); Peter Westphal, Jena (DE); Bernd Limburg, Essenheim (DE); Antje Pommereau, Otterberg (DE); Svend Berger, Mainz (DE)

(73) Assignee: Institut fur Mikrotechnik Mainz GmbH, Mainz (DE)

( * ) Notice: Subject to any disclaimer, the term of this patent is extended or adjusted under 35 U.S.C. 154(b) by 574 days.

(21) Appl. No.: 10/203,121

(22) PCT Filed: Feb. 9, 2001

(86) PCT No.: PCT/EP01/01420

§ 371 (c)(1),
(2), (4) Date: Aug. 14, 2003

(87) PCT Pub. No.: WO01/59403

PCT Pub. Date: Aug. 16, 2001

(65) Prior Publication Data
US 2005/0025676 A1    Feb. 3, 2005

(30) Foreign Application Priority Data
Feb. 11, 2000    (DE) ................. 100 06 083

(51) Int. Cl.
G01N 21/17    (2006.01)
(52) U.S. Cl. .................... 436/164; 422/82.05
(58) Field of Classification Search ............ 422/82.05; 436/164
See application file for complete search history.

(56) References Cited

U.S. PATENT DOCUMENTS 5,738,825 A    4/1998    Rudigier et al.

(Continued)

FOREIGN PATENT DOCUMENTS

DE    0 202 021    11/1986

(Continued)

OTHER PUBLICATIONS

Enzyme Immunoassays-From Concept to Product Development, S. S. Deshpanda, Chapman & Hall, 1996.

(Continued)

*Primary Examiner*—Lyle A Alexander
(74) *Attorney, Agent, or Firm*—Hudak, Shunk & Farine Co., LPA

(57) ABSTRACT

The invention relates to a method for quantitatively and/or qualitatively detecting layer thicknesses of biological or chemical molecules by means of ellipsometric measurements. Said molecules are deposited on at least one metal layer by virtue of interactions with a gaseous or liquid medium, whereby said metal layer is provided with an immobilisation layer. A method that can be carried out quickly is provided by including the surface plasmon resonance. Said method is provided with a significantly greater detection sensitivity and can be used not only for qualitatively detecting layers. According to the inventive method, the angle of incidence and/or the frequency of the electromagnetic radiation which is used for the ellipsometric measurements is/are adjusted in such a way that a surface plasmon resonance is produced in the metal layer. The detection sensitivity (δ cos Δ)/(thickness of the layer to be detected) is adjusted by means of the thickness of the metal layer.

28 Claims, 8 Drawing Sheets

U.S. PATENT DOCUMENTS 5,926,284 A 7/1999 Naya et al.

FOREIGN PATENT DOCUMENTS

| DE | 198 14 811 C1 | 8/1999 |
|---|---|---|
| EP | 0 067 921 | 12/1982 |
| EP | 0 286 195 | 10/1988 |
| EP | 0 326 291 A1 | 8/1989 |
| EP | 196 29 243 A1 | 1/1998 |
| WO | WO 86/07149 | 12/1986 |
| WO | 90/05295 | 5/1990 |
| WO | 95/22754 | 8/1995 |
| WO | 97/09618 | 3/1997 |
| WO | 98/57149 | 12/1998 |

OTHER PUBLICATIONS

Spectroscopic ellipsometry and biology: recent developments and challenges, Thin Solid Films 313-314, H. Arwin, 1998, pp. 764-774.
Surface plasmon resonance monitoring by means of polarization state measurement in reflected light as the basis of a DNA-probe biosensor, Sensors and Actuators B 30, A. A. Kruchinin, Yu.G. Vlasov, 1996, pp. 77-80.

METHOD FOR QUANTITATIVELY AND/OR QUALITATIVELY DETECTING LAYER THICKNESSES, A MICROREACTION VESSEL AND TITRE PLATE

FIELD OF THE INVENTION

The invention relates to a method for quantitatively and/or qualitatively detecting layer thicknesses of biological or chemical molecules, which due to interactions are deposited from a gaseous or liquid medium on at least one metal layer that is provided with an immobilization layer. The layer thicknesses are detected by ellipsometric measurements in which the ellipsometric parameters $\Psi$ and $\Delta$ are determined. The invention further relates to a microreaction vessel and to a titer plate in accordance with the claims.

BACKGROUND OF THE INVENTION

Such methods are employed in medical technology, biotechnology and in pharmaceutical technology, e.g. to detect antigen-antibody reactions.

An immobilization layer is defined as a coating of atoms or molecules that can selectively bind to other molecules. Interactions are defined as interactions between the atoms or molecules that are anchored to the immobilization layer and the molecules to be bound. These can be biological or chemical reactions.

Biological and chemical reactions that take place in liquid-filled cuvettes while forming thin films have thus far been detected, inter alia, by marking the substances involved, e.g. by fluorescent or radioactive molecules. This is described in S. S. Deshpande, "Enzyme Immunoassays—From Concept to Product Development," Chapman & Hall, 1996. This method is relatively simple to perform but has a number of drawbacks. The relevant molecules must first be labeled or purchased in labeled form. While these preparations are time-consuming, marking can moreover influence the biological or chemical interactions, which in turn affects the measurement results. The problems inherent in handling radioactive materials are a further drawback.

For this reason direct measuring methods that require no marking at all are increasingly being used. Two methods have proven suitable.

In surface plasmon resonance measurement, the resonance of free electrons is excited in approximately 50-60 nm thick metal layers, particularly gold or silver, (see B. Gedig, D. Trau and M. Orban, "Echtzeitanalyse biomolekularer Wechselwirkungen", [Real Time Analysis of Biomolecular Interactions] Laborpraxis, February 1998, pp. 26-28 and 30). This excitation of the free electrons occurs only if polarized light is applied parallel to the plane of incidence. For each measurement, either the angle of incidence or the employed light frequency must be passed through, so that the instrumentation is relatively complex. The reflected intensity as a function of the wavelength at a fixed angle or of the angle of incidence at a fixed wavelength shows a minimum in the resonance range.

Since the electromagnetic radiation when reflected is not confined to the thin metal film but in the so-called evanescent field interacts with approximately the first 100 to 300 nm of the medium above this film, the resonance angle or the resonance wavelength strongly depends on the refractive index of the layer located directly above the metal film. If the resonance conditions change, for instance, because small amounts of water are being replaced through biological or chemical reactions with formation of an additional layer, the minimum of the reflected intensity is shifted. This shift makes it possible only qualitatively to detect the growth of the layer but not its absolute thickness, for which the refractive index of the growing layer would have to be known. Thus, despite the substantial complexity of the instrumentation, the measurement result is not very meaningful. A corresponding measuring apparatus is described, for instance, in WO 90/05295.

The second method is ellipsometry in which the light is applied in such a way that it passes through a gaseous or liquid ambient medium and subsequently strikes the biological or chemical layer to be detected (see H. Arwin, "Spectroscopic ellipsometry and biology: recent developments and challenges," Thin Solid Films 313-314, 1998, pp. 764-774). In ellipsometric measurements, the ellipsometric parameters $\Psi$ and $\Delta$ are determined, for which the following is true:

$$r_p/r_s = (E_{rp}/E_{ep})/(E_{rs}/E_{es}) = \tan \Psi \cdot \exp(i\Delta)$$

$r_p$, $r_s$: complex reflectivities
E: complex electric field amplitude
Indices: p: parallel to the plane of incidence
    s: perpendicular to the plane of incidence
    e: radiated
    r: reflected $\Psi$ essentially includes the change in intensity through reflection of the light. $\Delta$ essentially includes the phase shift through reflection of the light; this parameter reacts very sensitively to film thicknesses.

EP 0 067 921 describes a biological test method for determining bioactive substances by means of ellipsometric measurements. A thin dielectric substrate is coated with an immobilization layer of a first biologically active substance, which interacts with a second bioactive substance. The optical changes in the biological layer are detected by ellipsometric measurements. Analysis is effected by plotting the ellipsometric parameters as a function of time and comparing these curves with reference curves obtained by measuring biological material with known concentrations. Irradiation through the back of the substrate was taken into consideration, but the sensitivity of the measurement with irradiation from the back was 30× poorer than with irradiation from the front. As a result, this known method has the drawback that special cuvettes are required and titer plates cannot be used at all.

In Sensors and Actuators B 30 (1996), pp. 77-80, it is proposed to examine the polarization state of the reflected light to detect DNA samples that are immobilized on a metal layer. As a reference, a metal layer without DNA molecules is examined. Both p- and s-polarized light is applied and the phase shift between the samples and the reference signal is evaluated. Instead of examining the angular dependence of the intensity as in the known surface plasmon measurements, the angular dependence of the polarization state is examined here.

Implementation in practice, however, would again require a complex apparatus due to the changes in the angle of irradiation that have to be made.

SUMMARY OF THE INVENTION

The object of the invention is to provide a method that can be performed quickly, has a clearly greater detection sensitivity in back measurements, and is suitable not only to detect layers qualitatively but also to measure the thickness of such layers. A further object of the invention is to provide microreaction vessels and titer plates that can be used for this method.

This object is attained by a method for quantitatively and/or qualitatively detecting layer thicknesses of biological or chemical molecules which due to interactions are deposited from a gaseous or liquid medium on at least one metal layer that is provided with an immobilization layer, by means of ellipsometric measurements in which the ellipsometric parameters $\Psi$ and $\Delta$ are determined, wherein the angle of incidence and/or the frequency of the electromagnetic radiation used for the ellipsometric measurements are adjusted such that a surface plasmon resonance is generated in the metal layer, the detection sensitivity ($\delta \cos \Delta$)/(thickness of the layer to be detected) is adjusted via the thickness of the metal layer, the electromagnetic radiation is applied on the side of the metal layer facing away from the immobilization layer, and the at least one ellipsometric measurement is taken during or after deposition and at least the associated $\cos \Delta$ is evaluated to determine the change in the thickness of the layer to be detected.

Surprisingly it has been found that the ellipsometric parameter $\Delta$ is strongly influenced by surface plasmon excitation. If the wavelength and/or the angle of incidence of the electromagnetic radiation used is adjusted relative to the employed metal such that surface plasmon excitation occurs, the detection sensitivity is increased significantly and is one order of magnitude greater than that obtainable by conventional ellipsometry, i.e. without surface plasmon excitation. This makes it possible to detect significantly smaller changes in layer thicknesses, or to detect layer growth caused by biological or chemical interactions at an earlier point in time.

Whereas prior art back radiation without metallic coating provides poor ellipsometric results, this drawback has not been found in the method according to the invention. This is attributable to the signal-amplifying metal layer that is used according to the invention. It makes it possible, for instance, to use conventional cuvettes and to take the measurement on the bottom wall of the cuvette. Particularly if conventional titer plates with microreaction vessels that are open toward the top are used, a large number of measurements can be taken in a short time, which is increasingly important especially in high throughput screening.

Since ellipsometry supplies an additional parameter, i.e. tan $\Psi$, the refractive index of the growing layer does not have to be known in order to be able to determine the absolute thickness of this growing layer. Thus, the method according to the invention makes it possible to obtain more information with greater accuracy. If the absolute thickness of the grown layer is to be determined, tan $\Psi$ is evaluated in addition to cos $\Delta$.

In contrast to conventional ellipsometry, the inventive method makes it possible further to increase the signal level and thus the detection sensitivity by optimizing the thickness of the metal layer. By adjusting the thickness of the metal layer, it is possible to increase the slope of the cos $\Delta$ curve and to raise the $\delta \cos \Delta$ to layer thickness ratio. This may limit the dynamic range with respect to the maximum measurable layer thickness since in principle the total cos $\Delta$ change cannot be greater than 2. This is not a drawback, however, since the cos $\Delta$ change can be reduced again if necessary through the selection of the layer thickness or the wavelength of the light.

The advantage of the inventive method is that neither the wavelength nor the angle of incidence has to be varied after the parameters for the surface plasmon excitation have been set. This is a significant advantage with respect to the complexity of the apparatus compared to measuring methods in which one of these parameters must be varied. The method makes it possible to examine more samples per time unit than has previously been the case because the systematic scanning of the angle of irradiation or the wavelength of the light can be dispensed with.

Preferably the ellipsometric measurements are performed during as well as before and/or after deposition. The measurements taken before deposition serve as a reference measurement, which is compared to the measurement or measurements taken during or after deposition. The change of cos $\Delta$ provides information on the thickness of the layer being formed. The reference measurements can also be used for different samples.

Another preferred embodiment provides that ellipsometric measurements are taken continuously during at least one time segment of deposition and that at least the time rate of change of the associated cos $\Delta$ values is analyzed. With these measurements it is possible to track the growth of the layers to be detected.

Preferably, the metal layer used is made of a metal or alloy that has a refractive index (real part) of <1 in the wavelength range of the electromagnetic radiation used. Advantageously, a layer of copper, gold, silver or aluminum or an alloy containing these metals is used.

Whereas prior-art surface plasmon resonance spectroscopy uses metal layers that are approximately 50 nm thick and thicker, it has been found for the inventive method that thicknesses of <50 nm, particularly between 10 and 45 nm, preferably between 10 and 40 nm are far more suitable. With layer thicknesses $\geq$50 nm, the cos $\Delta$ curve becomes clearly flatter as a function of the applied light frequency and the dynamic range of between −1 and +1 through which the cos $\Delta$ curve passes clearly decreases. For metal layer thicknesses of <10 nm, however, the sensitivities are too low.

It is also possible to use two or more metal or alloy layers in which surface plasmon excitation is possible. For instance, one layer may be made of a material that exhibits surface plasmon resonance for a defined angle of incidence in a defined wavelength range. This layer may be covered by a different metal or a different alloy. For instance, for the first layer silver may be used and for the second layer gold which, unlike silver, has the advantage of being inert. The total thickness of the two layers should be less than 50 nm, but the thicknesses of the individual layers may be selected arbitrarily.

It is further possible to conduct the ellipsometric measurements in either still or flowing media.

Preferably, the electromagnetic radiation used is monochromatic radiation. The advantage of monochromatic radiation is that it does not need to be spectrally filtered prior to detection.

Lasers may be used, for instance. Lamps, however, e.g. xenon lamps with broad spectral distribution may also be used as the radiation source. In this case spectral filtering prior to detection is advantageous.

Preferably, electromagnetic radiation in the wavelength range of 150 nm to 20 $\mu$m, preferably 300 nm to 3 $\mu$m is used.

The microreaction vessel is characterized in that the interior of the bottom wall of the vessel is provided with a metal layer that is suitable for exciting surface plasmons.

The configuration of the inventive titer plate corresponds to these microreaction vessels. The inside of the bottom wall of each individual microreaction vessel is also provided with such a metal layer.

This metal coating is preferably made of a metal or alloy that has a refractive index (real part) of <1 in the wavelength range of the electromagnetic radiation used for the measurements. The aforementioned metals and alloys are advantageously used. The metal layer is less than 50 nm thick and ranges preferably between 10 and 45 nm, especially between 20 and 40 nm.

To improve adhesion of the metal layer, an adhesion promoting layer, e.g. titanium, may be arranged between the metal layer and the bottom wall.

The metal layer preferably carries an immobilization layer.

On the underside of the bottom wall a structure is preferably provided for coupling-in and/or decoupling the electromagnetic radiation. This structure serves to guide the applied light with a minimum of losses and at the correct angle of incidence onto the metal layer and thus onto the layer to be detected. Suitable structures are prisms, particularly trapezoidal prisms, as well as half-cylinders or half-spheres.

In the case of the titer plate it is advantageous if the structure extends across the bottom walls of at least two microreaction vessels of the titer plate. Production of the titer plates is significantly simplified especially if a full row of microreaction vessels is assigned to a single structure.

The structure can, for instance, be glued on or can form an integral component of the bottom wall.

To minimize intensity losses, the underside of the bottom wall can also be provided with an antireflection coating.

The microreaction vessel can be a cuvette, particularly a cuvette that is open toward the top. The cuvette can also be a flow through cuvette.

The bottom wall is preferably flat.

BRIEF DESCRIPTION OF THE DRAWING

Exemplary embodiments of the invention will now be described in greater detail with reference to the drawings in which.

DETAILED DESCRIPTION OF THE INVENTION

Figure 1:
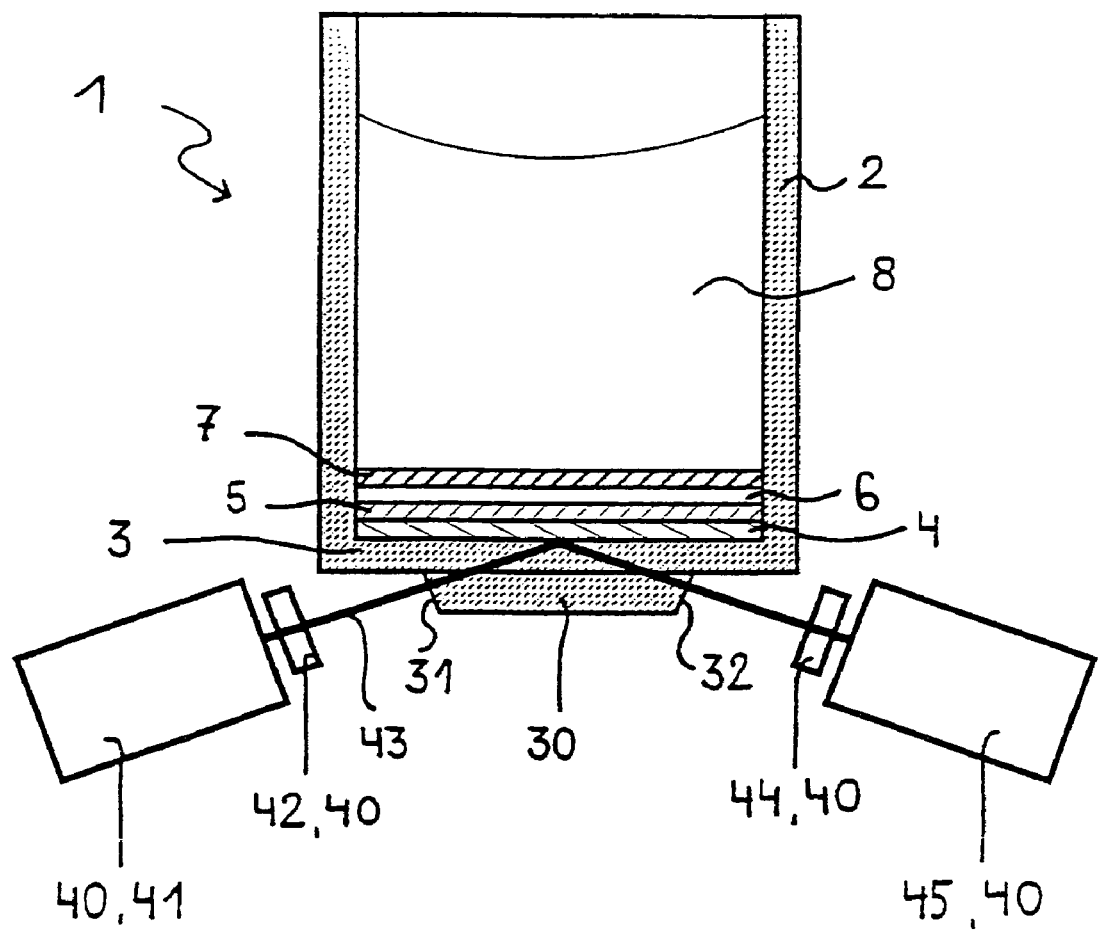
FIG. 1 is a section through a cuvette with connected ellipsometer.

FIG. 1 schematically depicts a microreaction vessel 1 in the form of a cuvette. The sidewalls 2 can be planar or circular. Since the ellipsometer is arranged on the underside of the microreaction vessel 1 and the electromagnetic radiation is applied through bottom wall 3, the form and material of the sidewalls are irrelevant.

Bottom wall 3 in this example is flat and on its underside carries a trapezoidal prism 30 with oblique entry and exit surfaces 31 and 32. Prism 30 is fixed to the bottom wall 3 by means of an immersion adhesive. The prism may also form an integral component of bottom wall 3.

The ellipsometer 40 is a conventional ellipsometer and has a light source 41 as the radiation source, a polarizer 42, an analyzer 44, and a detector 45. The light beam 43 in this example is applied at a 70° angle and due to the trapezoidal prism 30 strikes the layers arranged in the interior of the microreaction vessel on the upper side of bottom wall 3 without refraction. Bottom wall 3 carries an adhesion promoting layer 4 on which a metal layer 5 is disposed. Metal layer 5 carries an immobilization layer 6 on which layer 7 grows. This may, for instance, be a layer of antibodies that are suspended in liquid 8. The layer thicknesses are exaggerated in FIGS. 1 and 2.

Figure 2:
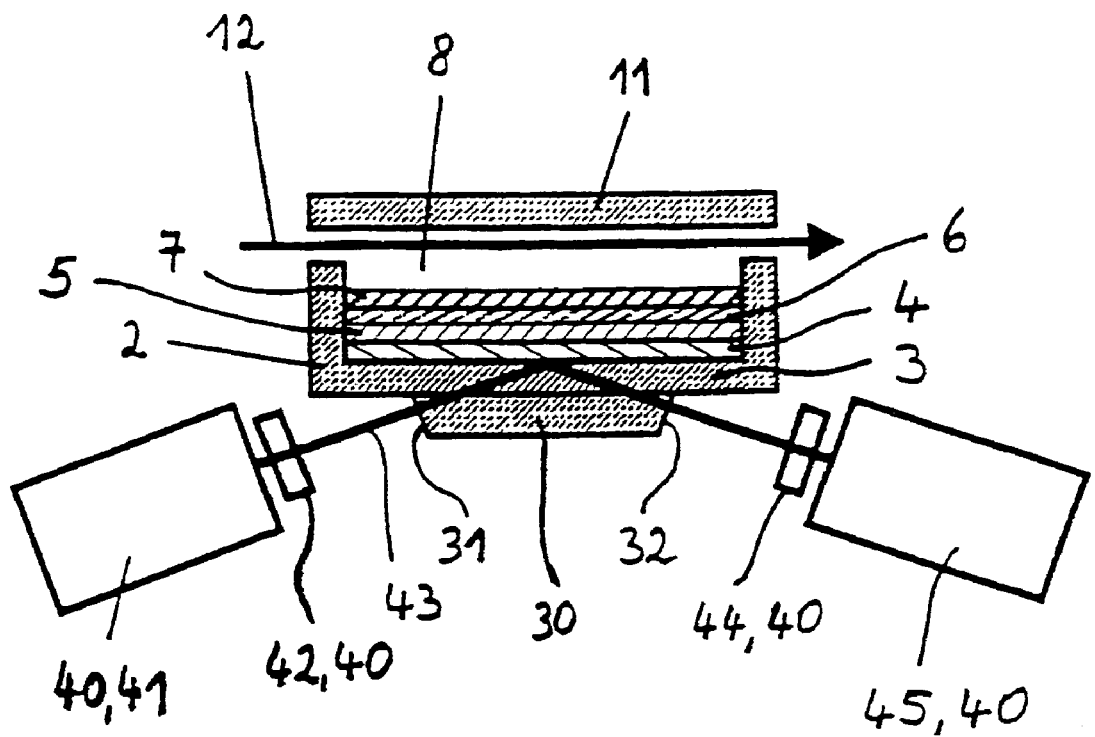
FIG. 2 shows another embodiment of the cuvette.

FIG. 2 shows another embodiment, which is distinguished from that depicted in FIG. 1 only in that the cuvette is a flow through cuvette with a cover plate 11. The layer structure and the ellipsometer 40 are identical. The flow direction of the medium is indicated by arrow 12.

Figure 3:
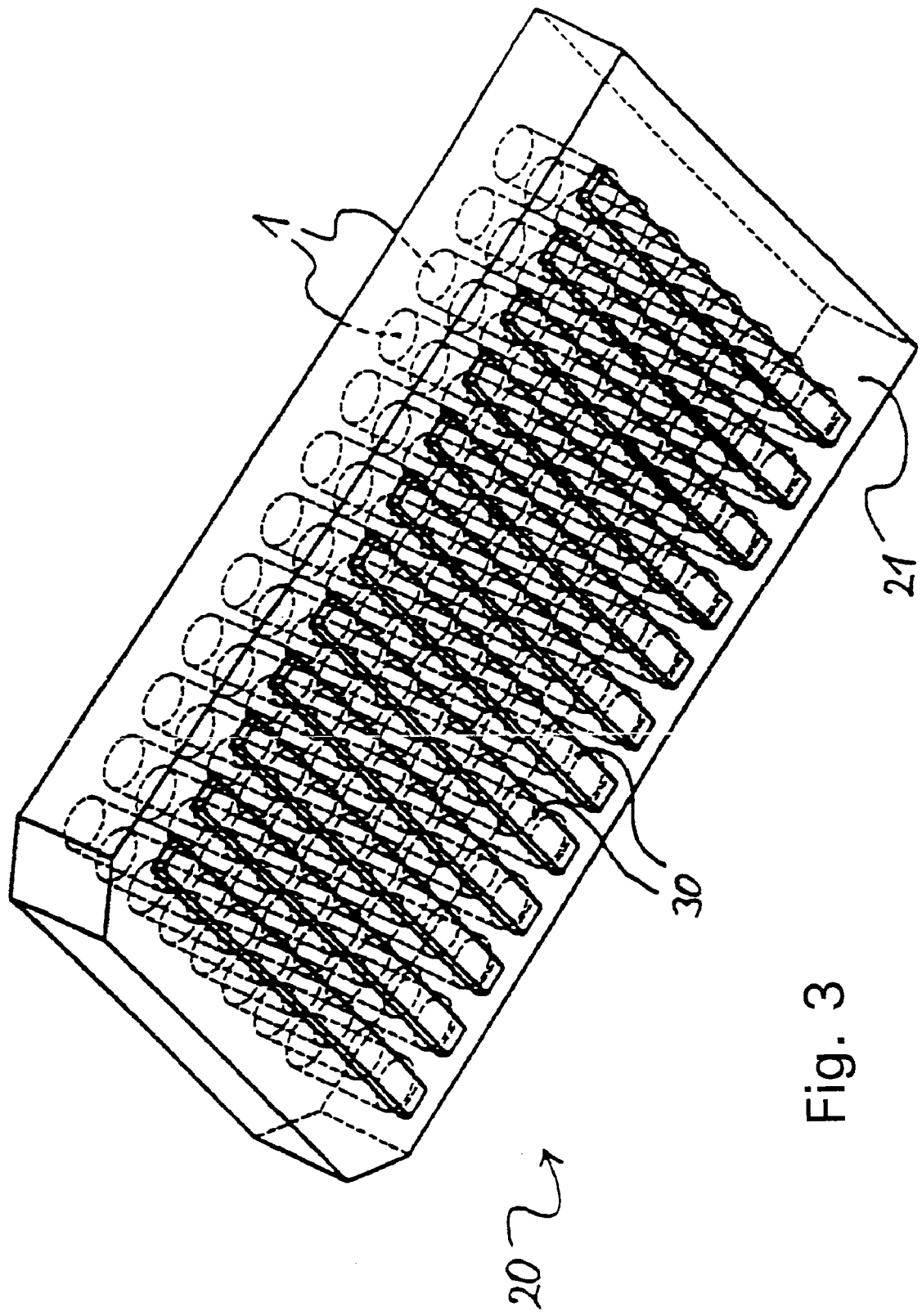
FIG. 3 is a perspective view of a titer plate.

FIG. 3 is a top view of the underside of a titer plate 20. The individual microreaction vessels 1 are arranged in rows in titer plate 20. This makes it possible to provide a common trapezoidal prism 30 on bottom plate 21 for each row.

Figure 4:
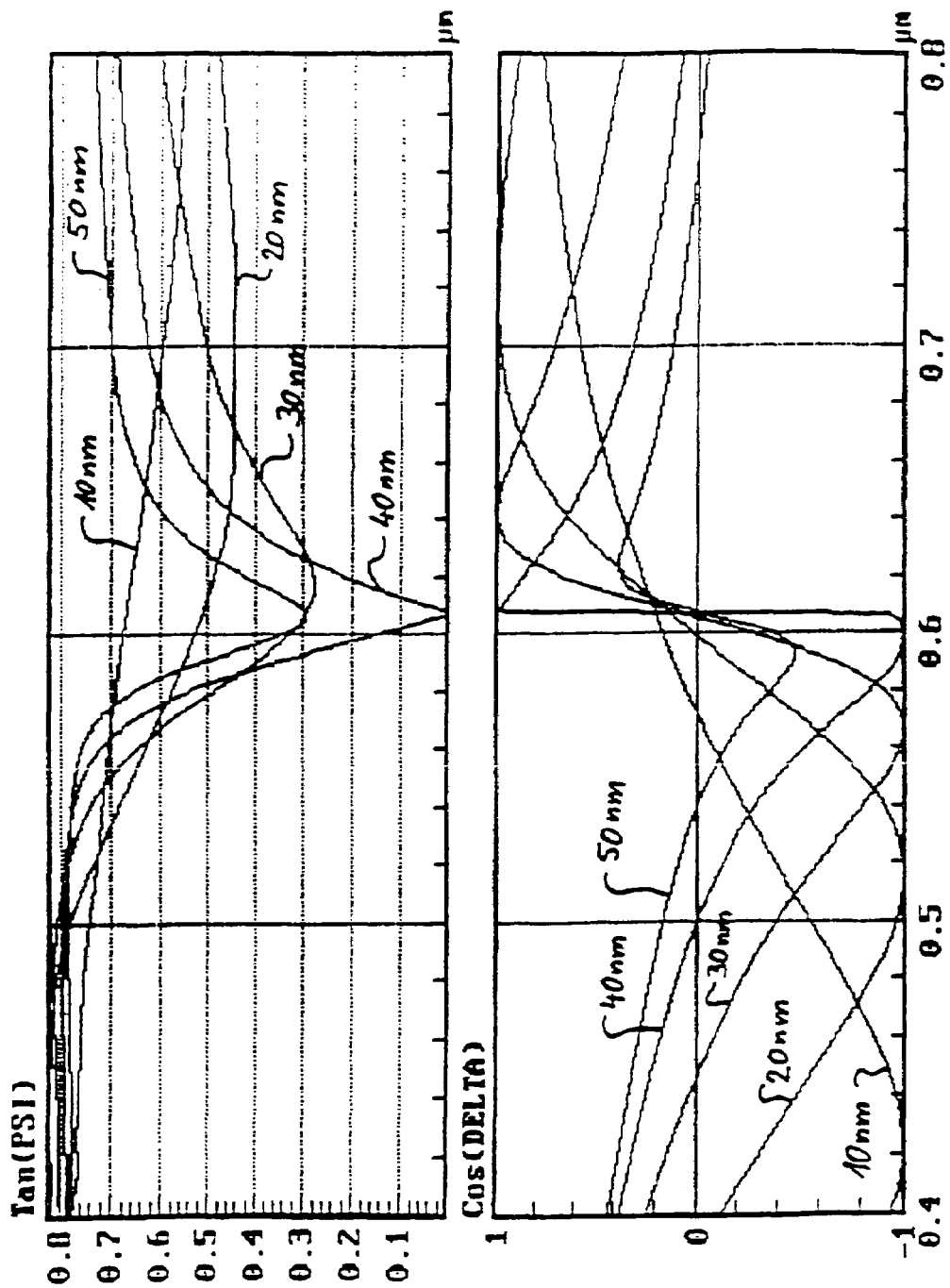
FIG. 4 shows two diagrams illustrating the adjustment of both the surface plasmon resonance and the thickness of the metal layer.

In FIG. 4, tan Ψ is shown at the top and cos Δ at the bottom, each as a function of the applied wavelength. To adjust the surface plasmon resonance, the unpolarized light is guided at an angle of incidence of, for instance, 70° onto the underside of the bottom wall of a cuvette as illustrated, for example, in FIG. 1. Through excitation of the surface plasmon resonance in metal layer 5, a distinct minimum is established for tan Ψ at a certain wavelength and is accompanied by a steep slope of the corresponding cos Δ curve.

After the wavelength for the excitation of surface plasmon resonance has been determined in this manner, further optimization occurs by adjusting the thickness of metal layer 5. For both tan Ψ and cos Δ, 5 curves are plotted for the thicknesses of 10 nm, 20 nm, 30 nm, 40 nm and 50 nm. The curves apply to silver layers; similar values result for gold layers. It is clearly evident that for layer thicknesses of 10 nm and 50 nm the cos Δ curve is flat and the minima of tan Ψ are less distinct. Thinner metal layers are preferred for determining biological layers of large thicknesses. With metal layer thicknesses <10 nm, however, the resulting sensitivities are rather too low. Metal layer thicknesses ≧50 nm are less suitable for the method according to the invention because of the low dynamic range. Only the curves for thicknesses of 20 to 40 nm show a steep slope and thus high detection sensitivity, with the entire dynamic range between −1 and +1 being utilized.

Figure 5:
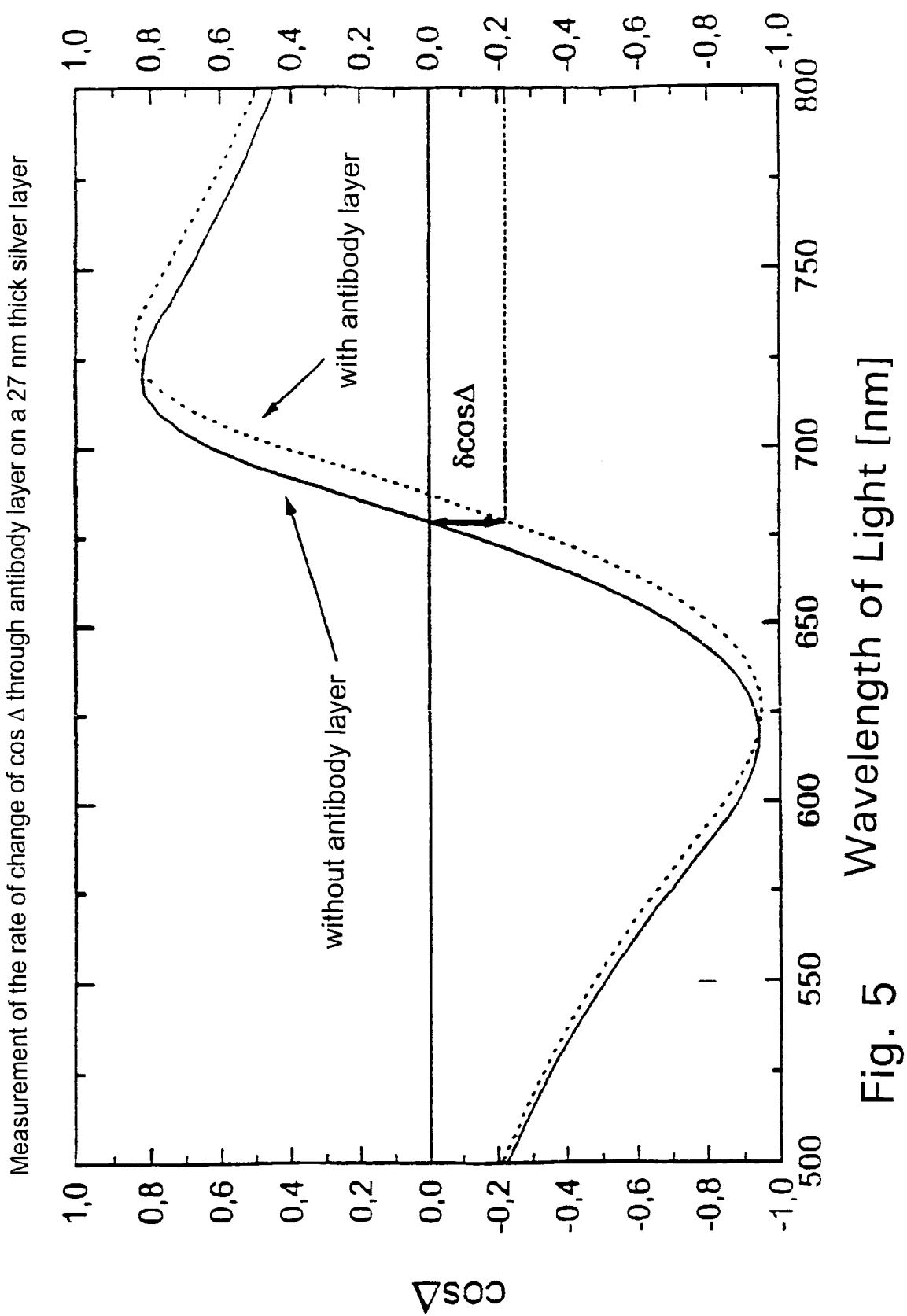
FIG. 5 shows the measurement of the rate of change of cos Δ as a function of the wavelength of the applied light.
Figure 6:
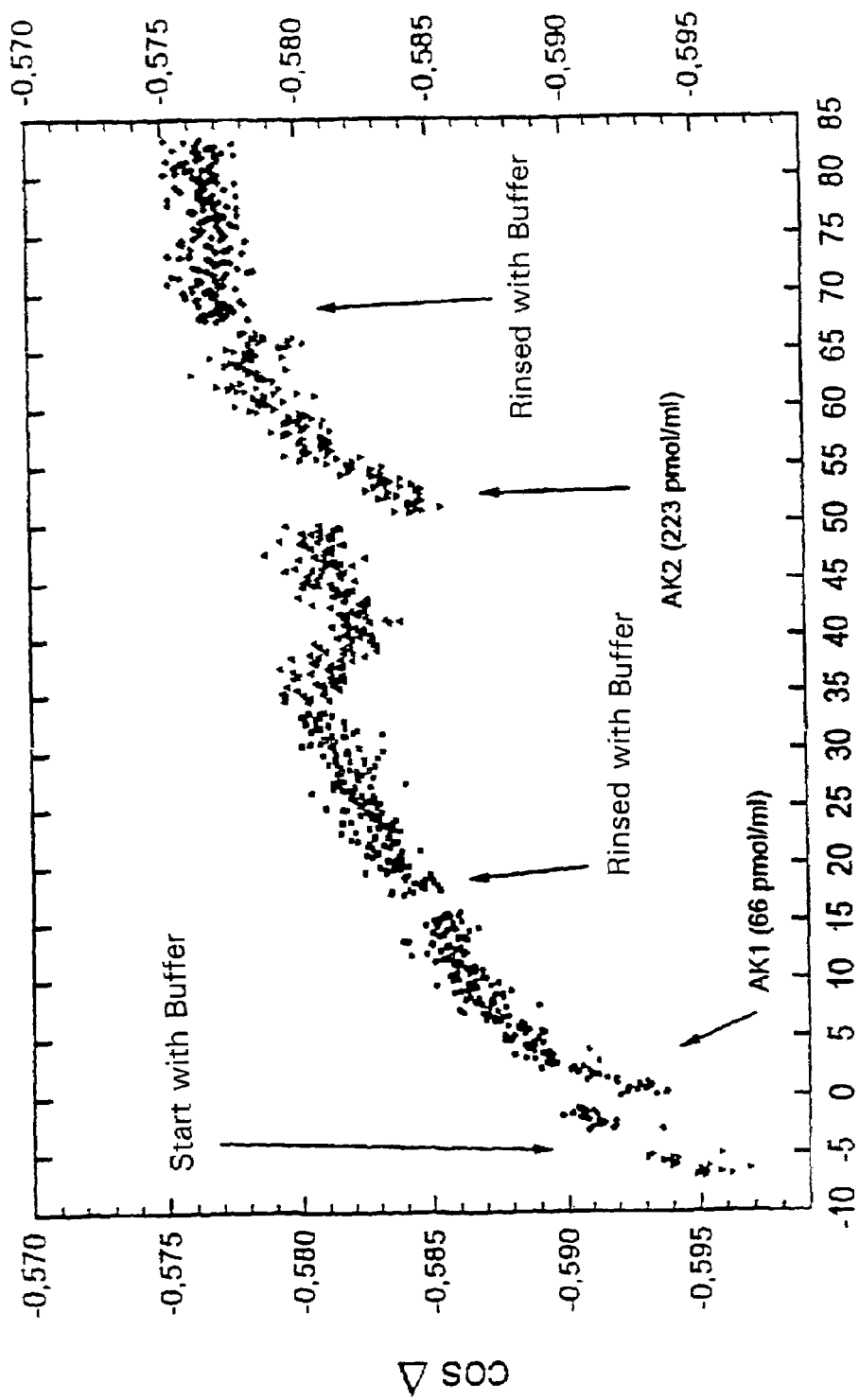
FIG. 6 shows cos Δ as a function of the measuring time without a metal layer, and FIGS. 7+8 show cos Δ as a function of the measuring time using silver or gold layers.
Figure 7:
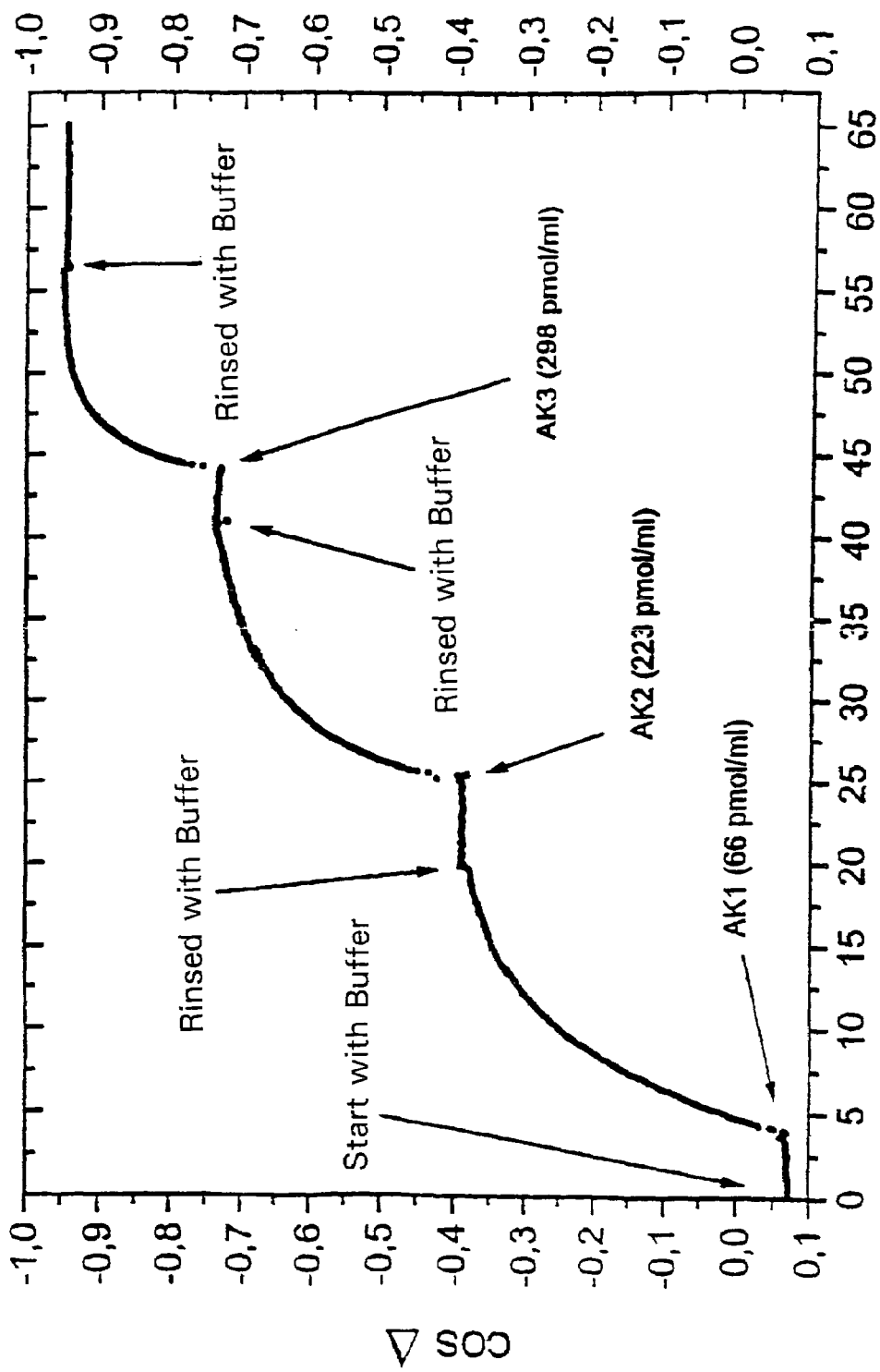

After adjusting the optimization of the wavelength, the angle of incidence and the thickness of the metal layer, measurements were performed, which are shown in FIG. 5 to 7.

FIG. 5 shows cos Δ as a function of the wavelength of the applied light. The solid curve on the left indicates measurements without antibodies, while the dotted curve indicates measurements with antibodies. The measurements were taken on cuvettes with glass bottoms whose bottom wall was provided with a 12 nm thick titanium coating, a 27 nm thick silver layer and a 17 nm thick streptavidine layer as an immobilization layer. The angle of incidence of the light was 70°. After an interaction time of 10 minutes, a 2.5 nm thick antibody layer had grown, which is detected by the shift of the cos Δ curve. The spectral measurements serve to determine the optimum wavelength with respect to the detection sensitivities of the dynamic range. In this instance, the resulting optimal wavelength range was 640 to 700 nm. Taking a single wavelength measurement at, for instance, 780 nm, makes it possible, as a function of the incubation time of the antibody solution, to measure an increase in the antibody layer thickness which is approximately proportional to the change in the cos Δ value. After an increase in the antibody layer by 2.5 nm, the cos Δ value has changed by approximately 0.2. The resulting detection sensitivity (|δ cos Δ|/layer thickness) is 0.08/nm. This detection sensitivity is more than one order of magnitude above that achieved with "conventional ellipsometry" (e.g. with a metallic substrate).

In FIG. 6 cos Δ is shown as a function of the measuring time. This is a comparison measurement taken without the metal layer on the bottom wall of the cuvette. The arrows indicate the instants when either an aqueous buffer solution or antibody-containing aqueous solutions at a concentration of 66 pmol/ml and 223 pmol/ml, respectively, were used (see FIG. 6). As soon as the antibodies were added, the cos Δ curve rose as a function of the measuring time. However, this rise is hardly distinguishable from cos Δ changes that occur in the absence of antibodies (buffer solution only) due to thermal drifts.

Figure 8:
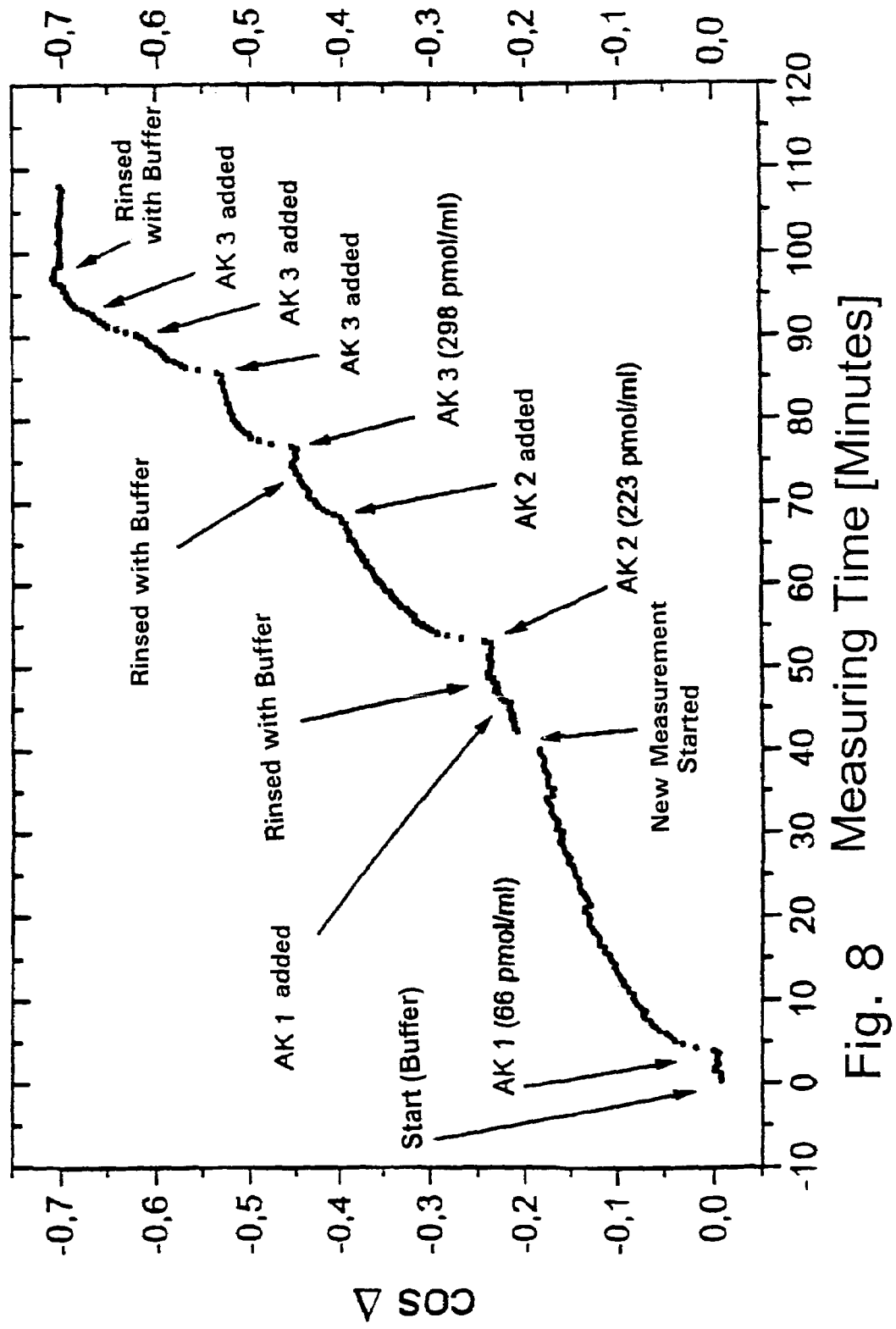

The scattering of the measuring points is considerable, and it is demonstrated that clearly better results are obtained with the use of a silver or a gold layer on the inside of the bottom wall, as shown in FIGS. 7 and 8. The range of values of cos Δ extends from 0.1 to −1, while the range according to FIG. 6 extends only from −0.57 to −0.595. It is clear that providing the metal layer and adjusting the surface plasmon resonance makes it possible to obtain clearly higher signal levels and not just an improvement of the signal to noise ratio, which can be simply achieved by longer measuring times.

| Reference Numerals | |
|---|---|
| 1 | microreaction vessel |
| 2 | sidewall |
| 3 | bottom wall |
| 4 | adhesion promoting layer |
| 5 | metal layer |
| 6 | immobilization layer |
| 7 | layer of coupled antibodies to be detected |
| 8 | liquid with antibodies |
| 10 | flow through cuvette |
| 11 | cover plate |
| 12 | flowing liquid |
| 20 | titer plate |
| 21 | bottom plate |
| 30 | prism |
| 31 | entry surface |
| 32 | exit surface |
| 40 | ellipsometer |
| 41 | light source |
| 42 | polarizer |
| 43 | light beam |
| 44 | analyzer |
| 45 | detector |

What is claimed is:

1. A method for quantitatively and/or qualitatively detecting layer thicknesses of biological or chemical molecules which due to interactions are deposited from a gaseous or liquid medium on at least one metal layer that is provided with an immobilization layer, by determining ellipsometric parameters $\Psi$ and $\Delta$ by ellipsometric measurements, for which the following holds:

$$rp/rs = (Erp/Eep)/(Ers/Ees) = \tan\Psi \cdot \exp(i\Delta) = \tan\Psi(\cos\Delta + i\sin\Delta)$$

rp, rs: complex reflectivities
E: complex electric field amplitude
indices: p: parallel to plane of incidence
s: perpendicular to plane of incidence
e: radiated
r: reflected the method consisting of the steps:
applying electromagnetic radiation on a side of the at least one metal layer facing away from the immobilization layer;
adjusting an angle of incidence and determining a wavelength for an excitation of surface plasmon resonance;
measuring tan $\Psi$ and cos $\Delta$ curves for several different metal layer thicknesses and as a function of wavelength;
adjusting the at least one metal layer thickness so that a steep slope in the cos $\Delta$ function is achieved;
after the angle of incidence, a frequency of the electromagnetic radiation and the thickness of the at least one metal layer have been adjusted, taking at least one ellipsometric measurement during or after deposition of the molecules without varying wavelength and the angle of incidence and
evaluating at least the associated cos $\Delta$ to determine the thickness of the molecular layer to be detected.

2. The method according to claim 1, wherein ellipsometric measurements are taken during deposition and one or more of before deposition and after deposition.

3. The method according to claim 1, wherein the ellipsometric measurements are taken in either a still or a flowing medium.

4. The method according to claim 1, wherein the thickness of the metal layer is between 10 and 45 nm.

5. The method according to claim 4, wherein the thickness of the metal layer is between 20 and 40 nm.

6. The method according to claim 1, wherein the electromagnetic radiation used is a monochromatic radiation.

7. The method according to claim 6, wherein the electromagnetic radiation used is monochromatic light.

8. The method according to claim 1, wherein electromagnetic radiation in the wavelength range of 150 nm to 20 μm is used.

9. The method according to claim 8, wherein electromagnetic radiation in the wavelength range of 300 nm to 3 μm is used.

10. The method according to claim 1, wherein a metal or alloy layer is used having a refraction index of <1 in the wavelength range of the electromagnetic radiation used.

11. The method according to claim 10, wherein the metal is a layer of copper, silver, gold or aluminum or an alloy that contains at least one of these metals is used.

12. The method according to claim 11, wherein the thickness of the metal layer is between 10 and 45 nm.

13. The method according to claim 12, wherein the thickness of the metal layer is between 20 and 40 nm.

14. The method according to claim 12, wherein the ellipsometric measurements are taken in either a still or a flowing medium.

15. The method according to claim 14, wherein the electromagnetic radiation used is a monochromatic radiation.

16. The method according to claim 15, wherein the electromagnetic radiation used is monochromatic light.

17. The method according to claim 15, wherein electromagnetic radiation in the wavelength range of 150 nm to 20 μm is used.

18. The method according to claim 17, wherein electromagnetic radiation in the wavelength range of 300 nm to 3 μm is used.

19. The method according to claim 1, wherein ellipsometric measurements are taken continuously during one time segment of deposition of the molecules and at least the time rate of change of the associated cos $\Delta$ is evaluated.

20. The method according to claim 19, wherein a metal or alloy layer is used having a refraction index of <1 in the wavelength range of the electromagnetic radiation used.

21. The method according to claim 20, wherein the metal is a layer of copper, silver, gold or aluminum or an alloy that contains at least one of these metals is used.

22. The method according to claim 21, wherein the thickness of the metal layer is between 10 and 45 nm.

23. The method according to claim 22, wherein the thickness of the metal layer is between 20 and 40 nm.

24. The method according to claim 22, wherein the ellipsometric measurements are taken in either a still or a flowing medium.

25. The method according to claim 24, wherein the electromagnetic radiation used is a monochromatic radiation.

26. The method according to claim 25, wherein the electromagnetic radiation used is monochromatic light.

27. The method according to claim 25, wherein electromagnetic radiation in the wavelength range of 150 nm to 20 μm is used.

28. The method according to claim 27, wherein electromagnetic radiation in the wavelength range of 300 nm to 3 μm is used.

* * * * *